(12) United States Patent
Chae et al.

(10) Patent No.: US 12,321,039 B2
(45) Date of Patent: Jun. 3, 2025

(54) IMAGE CAPTURING LENS SYSTEM

(71) Applicant: SAMSUNG ELECTRO-MECHANICS CO., LTD., Suwon-si (KR)

(72) Inventors: Kyu Min Chae, Suwon-si (KR); Sot Eum Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 18/317,337

(22) Filed: May 15, 2023

(65) Prior Publication Data
US 2023/0280566 A1    Sep. 7, 2023

Related U.S. Application Data

(63) Continuation of application No. 16/433,081, filed on Jun. 6, 2019, now Pat. No. 11,686,920.

(30) Foreign Application Priority Data

Jan. 2, 2019   (KR) .................. 10-2019-0000279

(51) Int. Cl.
*G02B 9/62* (2006.01)
*G02B 7/02* (2021.01)
*G02B 7/04* (2021.01)
*H04N 23/55* (2023.01)

(52) U.S. Cl.
CPC .............. *G02B 9/62* (2013.01); *G02B 7/021* (2013.01); *G02B 7/04* (2013.01); *H04N 23/55* (2023.01)

(58) Field of Classification Search
CPC . G02B 9/62; G02B 7/021; G02B 7/04; G02B 7/028; G02B 13/18; G02B 13/0045; G02B 3/02; H04N 23/55
See application file for complete search history.

(56) References Cited

U.S. PATENT DOCUMENTS

| | | | |
|---|---|---|---|
| 3,877,796 | A | 4/1975 | Yabe et al. |
| 4,239,340 | A | 12/1980 | Ogino |
| 10,649,179 | B2 | 5/2020 | Hsu et al. |

(Continued)

FOREIGN PATENT DOCUMENTS

| | | |
|---|---|---|
| CN | 104950424 A | 9/2015 |
| CN | 106997086 A | 8/2017 |

(Continued)

OTHER PUBLICATIONS

Grey, "Athermalization of Optical Systems", *Journal of the Optical Society of America*, vol. 38, No. 6,.Jun. 1948 (pp. 542-546).

(Continued)

*Primary Examiner* — Balram T Parbadia
*Assistant Examiner* — Gabriel A Sanz
(74) *Attorney, Agent, or Firm* — NSIP Law

(57) ABSTRACT

An image capturing lens system includes a first lens having negative refractive power, a second lens having positive refractive power while having a convex object-side surface, a third lens having positive refractive power, a fourth lens having positive refractive power, a fifth lens having negative refractive power with a concave object-side surface and a concave image-side surface, and a sixth lens having positive refractive power.

16 Claims, 19 Drawing Sheets

(56) References Cited

U.S. PATENT DOCUMENTS

| | | | |
|---|---|---|---|
| 2003/0189761 A1* | 10/2003 | Park | G02B 15/143503 359/689 |
| 2008/0117529 A1 | 5/2008 | Jeong | |
| 2009/0059395 A1 | 3/2009 | Lin et al. | |
| 2011/0304921 A1 | 12/2011 | Nagahara | |
| 2012/0206822 A1 | 8/2012 | Hsieh et al. | |
| 2013/0201382 A1* | 8/2013 | Ueda | G02B 13/009 359/689 |
| 2014/0139720 A1* | 5/2014 | Ogata | G02B 15/145121 359/683 |
| 2015/0131168 A1 | 5/2015 | Asami | |
| 2015/0277083 A1 | 10/2015 | Chae | |
| 2015/0277091 A1* | 10/2015 | Sugita | G02B 7/10 359/684 |
| 2016/0147044 A1 | 5/2016 | Kondo | |
| 2016/0252709 A1 | 9/2016 | Lin et al. | |
| 2016/0282585 A1* | 9/2016 | Shih | G02B 13/0045 |
| 2016/0341928 A1 | 11/2016 | Liu et al. | |
| 2017/0017064 A1 | 1/2017 | Jo et al. | |
| 2017/0153422 A1 | 6/2017 | Tang et al. | |
| 2017/0160520 A1 | 6/2017 | Tang et al. | |
| 2017/0212329 A1 | 7/2017 | Hwang et al. | |
| 2017/0212337 A1* | 7/2017 | Lee | G02B 13/009 |
| 2017/0315330 A1 | 11/2017 | Chiu | |
| 2017/0336603 A1* | 11/2017 | Chen | G02B 27/0025 |
| 2018/0074293 A1 | 3/2018 | Hsu et al. | |
| 2018/0203207 A1 | 7/2018 | Chen et al. | |
| 2018/0203209 A1 | 7/2018 | Chen et al. | |
| 2018/0213151 A1* | 7/2018 | Joujiki | G02B 13/0045 |
| 2018/0299649 A1 | 10/2018 | Hsu et al. | |
| 2018/0341085 A1 | 11/2018 | Bone et al. | |
| 2019/0121063 A1 | 4/2019 | Li et al. | |
| 2019/0146190 A1 | 5/2019 | Chen et al. | |
| 2019/0196151 A1 | 6/2019 | Chen et al. | |
| 2020/0150386 A1 | 5/2020 | Wei et al. | |

FOREIGN PATENT DOCUMENTS

| | | |
|---|---|---|
| CN | 108732716 A | 11/2018 |
| JP | 2006-18199 A | 1/2006 |
| KR | 10-2014-0019660 A | 2/2014 |
| KR | 10-2018-0071948 A | 6/2018 |

OTHER PUBLICATIONS

Chinese Office Action issued on Jan. 6, 2022 in corresponding Chinese Patent Application No. 201910880618.4 (7 pages in English, 9 pages in Chinese).

Chinese Office Action issued on Aug. 11, 2022, in counterpart Chinese Patent Application No. 201910880618.4 (5 Pages in English, 7 Pages in Chinese).

Korean Office Action issued on Apr. 29, 2024, in counterpart Korean Patent Application No. 10-2019-0000279 (8 pages in English, 5 pages in Korean).

Chinese Office Action issued on Apr. 30, 2025, in corresponding Chinese Patent Application No. 202310064285.4.(7pages in English, 12pages in Chinese).

* cited by examiner

IMAGE CAPTURING LENS SYSTEM

CROSS-REFERENCE TO RELATED APPLICATIONS

This application is a continuation of U.S. patent application Ser. No. 16/433,081 filed on Jun. 6, 2019, now U.S. Pat. No. 11,686,920 issued on Jun. 27, 2023, which claims the benefit under 35 USC 119(a) of Korean Patent Application No. 10-2019-0000279 filed on Jan. 2, 2019 in the Korean Intellectual Property Office, the entire disclosures of which are incorporated herein by reference for all purposes.

BACKGROUND

1. Field

The following description relates to an image capturing lens system which may implement constant optical performance irrespective of temperature variations in a surrounding environment.

2. Description of Background

Since a typical surveillance camera, mounted in a vehicle, captures only a shape of a peripheral object, such a surveillance camera does not need to have high resolution. However, as an autonomous driving function has been added to a vehicle, there is demand for a lens system appropriate for a camera which may capture a distant object or may clearly capture a nearby object.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an image capturing lens system includes a first lens having negative refractive power, a second lens having positive refractive power while having a convex object-side surface, a third lens having positive refractive power, a fourth lens having positive refractive power, a fifth lens having negative refractive power while having a concave object-side surface and a concave image-side surface, and a sixth lens having positive refractive power. The first to sixth lenses are sequentially disposed from an object side of the image capturing lens system.

The image capturing lens system may include a stop disposed between the second lens and the third lens.

One of the third to sixth lenses may be formed of glass.

The one lens formed of glass may have positive refractive power.

Among the first to sixth lenses, four or more lenses may be formed of plastic.

The image capturing lens system may satisfy $Gf/f<2.0$, where Gf is a focal length of the one lens formed of glass, and f is a focal length of the image capturing lens system.

The first lens may include a convex object-side surface.

The image capturing lens system may satisfy $0.7<BFL/S8S13$, where BFL is a distance from an image-side surface of the sixth lens to an imaging plane, and S8S13 is a distance from an object-side surface of the fourth lens to an image-side surface of the sixth lens.

The image capturing lens system may satisfy $D34<D23$ and $D45<D34$, where D23 is a distance from an image-side surface of the second lens to an object-side surface of the third lens, D34 is a distance from an image-side surface of the third lens to the object-side surface of the fourth lens, and D45 is a distance from an image-side surface of the fourth lens to an object-side surface of the fifth lens.

In another general aspect, an image capturing lens system includes a first lens, a second lens, a stop, a third lens, a fourth lens, a fifth lens, and a sixth lens sequentially disposed from an object side of the image capturing lens system. The third lens or the fourth lens is formed of glass and the image capturing lens system satisfies $0.7<BFL/S8S13$, where BFL is a distance from an image-side surface of the sixth lens to an imaging plane, and S8S13 is a distance from an object-side surface of the fourth lens to an image-side surface of the sixth lens.

The first lens may have negative refractive power.

The third lens and the fourth lens may have positive refractive power.

The image capturing lens system may satisfy $f3/f<2.0$ and $f4/f<2.0$, where f is a focal length of the image capturing lens system, f3 is a focal length of the third lens, and f4 is a focal length of the fourth lens.

The second lens may include a convex image-side surface.

The image capturing lens system may satisfy $D34<D23$, where D23 is a distance from an image-side surface of the second lens to an object-side surface of the third lens, and D34 is a distance from an image-side surface of the third lens to the object-side surface of the fourth lens.

The image capturing lens system may satisfy $D45<D34$, where D34 is a distance from an image-side surface of the third lens to the object-side surface of the fourth lens, and D45 is a distance from an image-side surface of the fourth lens to an object-side surface of the fifth lens.

The third lens may include a concave object-side surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
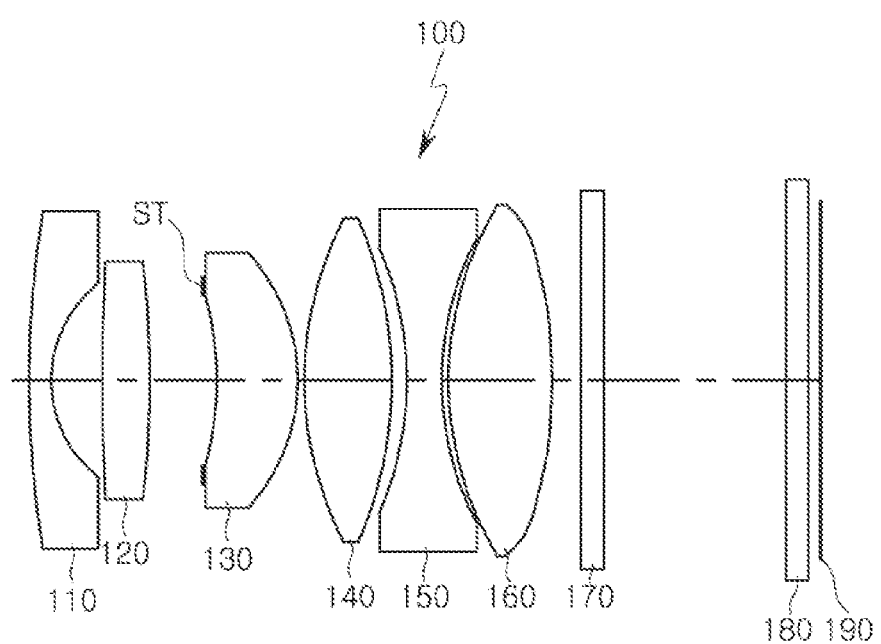
FIG. 1 illustrates a configuration of an image capturing lens system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, examples of the present disclosure will be described as follows with reference to the attached drawings.

In the examples, an entirety of a radius of curvature, a thickness, and a focal length of a lens are indicated in millimeters (mm). Further, a thickness of a lens, and a gap between lenses are distances measured based on an optical axis of the lens.

In a description of a form of a lens, a surface of a lens being convex indicates that an optical axis region of a corresponding surface is convex, while a surface of a lens being concave indicates that an optical axis region of a corresponding surface is concave. Therefore, in a configuration in which a surface of a lens is described as being convex, an edge portion of the lens may be concave. In a similar manner, in a configuration in which a surface of a lens is described as being concave, an edge portion of the lens may be convex.

An image capturing lens system may include a plurality of lenses and a stop. For example, the image capturing lens system may include a first lens, a second lens, a stop, a third lens, a fourth lens, a fifth lens, and a sixth lens, sequentially disposed from an object side. In the descriptions below, configurations of the lenses will be described.

The first lens may have refractive power. For example, the first lens may have negative refractive power.

The first lens may have a convex surface. For example, the first lens may have a convex object-side surface.

The first lens may be formed of a material having a constant refractive index in spite of temperature variations. For example, the first lens may be formed of glass, but a material of the first lens is not limited to glass.

The first lens may have a predetermined refractive index. For example, the first lens may have a refractive index of 1.7 or higher. When the first lens is formed of plastic, the first lens may have a refractive index lower than 1.7. The first lens may have an Abbe number greater than an Abbe number of the second lens. For example, the first lens may have an Abbe number of 45 or more.

The second lens may have refractive power. For example, the second lens may have positive or negative refractive power.

The second lens may have a convex surface. For example, the second lens may have a convex object-side surface or a convex image-side surface.

The second lens may include an aspherical surface. For example, both surfaces of the second lens may be aspherical. The second lens may be formed of a material having high light transmissivity and improved workability. For example, the second lens may be formed of plastic.

The second lens may have a predetermined refractive index. For example, the second lens may have a refractive index of 1.6 or more. The second lens may have a predetermined Abbe number. For example, the second lens may have an Abbe number lower than 23.

The stop is disposed between the second lens and the third lens. The stop may adjust an intensity of light, incident on an imaging plane, to clearly capture an image, even in a high-luminance environment. In addition, the stop may adjust an intensity of light, incident on the third to sixth lenses, to reduce thermal deformation of lenses caused by the incident light.

The third lens may have refractive power. For example, the third lens may have positive refractive power.

The third lens may have a convex surface. For example, the third lens may have a convex image-side surface. The third lens may have an Abbe number. As an example, the third lens may have an Abbe number of 50 or more.

The fourth lens may have refractive power. For example, the fourth lens may have positive refractive power.

The fourth lens may have at least one convex surface. For example, at least one of an image-side surface and an object-side surface of the fourth lens may be convex. The fourth lens may have an Abbe number of 45 or more.

One of the third and fourth lenses may be formed of a material having a constant refractive index in spite of temperature variations. For example, the third lens may be formed of glass or the fourth lens may be formed of glass.

The fifth lens may have refractive power. For example, the fifth lens may have negative refractive power.

The fifth lens may have at least one concave surface. For example, both an object-side surface and an image-side surface of the fifth lens may be concave.

The fifth lens may include at least one aspherical surface. For example, both the object-side surface and the image-side surface of the fifth lens may be aspherical. The fifth lens may be formed of a material having high light transmissivity and improved workability. For example, the fifth lens may be formed of plastic. The fifth lens may have a predetermined refractive index. For example, the fifth lens may have a refractive index of 1.6 or more. The fifth lens may have an Abbe number lower than an Abbe number of the fourth lens. For example, the fifth lens may have an Abbe number lower than 30.

The sixth lens may have refractive power. For example, the sixth lens may have a positive refractive index.

The sixth lens may have a convex surface. For example, the sixth lens may have a convex object-side surface.

The sixth lens may be formed of a material having high light transmissivity and improved workability. For example, the sixth lens may be formed of plastic, but a material of the sixth lens is not limited to the plastic. The sixth lens may include at least one aspherical surface. For example, both an object-side surface and an image-side surface of the sixth lens may be aspherical.

The sixth lens may have a predetermined refractive index. For example, the sixth lens may have a refractive index lower than 1.6.

The image capturing lens system may include one or more aspherical lenses. For example, among the first to sixth lenses, four or more lenses may include aspherical surfaces. For example, one of the lenses, disposed on an object-side surface or an image-side surface of a stop, may be a spherical lens. The image capturing lens system, satisfying the above condition, may be advantageous to implement a high resolution and to improve aberration. The aspherical surface may be represented by Equation (1) below.

$$Z = \frac{cr^2}{1+\sqrt{1-(1+k)c^2r^2}} + Ar^4 + Br^6 + Cr^8 + Dr^{10} + Er^{12} - Fr^{14} + Gr^{16} + Hr^{18} \qquad \text{Equation (1)}$$

In Equation (1), "c" is an inverse of a radius of a curvature of a respective lens, "k" is a conic constant, "r" is a distance from a certain point on an aspherical surface to an optical axis, "A" to "H" are aspheric constants, and "Z" (or SAG) is a height from a certain point on an aspherical surface to an apex of the aspherical surface in an optical axis direction.

An image capturing lens system includes an image sensor. The image sensor may be configured to implement high resolution. A surface of the image sensor may form an imaging plane on which an image is formed.

The image capturing lens system includes a filter and a cover glass. For example, the filter may be disposed between the sixth lens and the image sensor to filter components decreasing resolution, and the cover glass may block foreign objects.

The image capturing lens system is configured to significantly reduce a temperature-dependent variation in focal length. For example, among the first to sixth lenses, four or more lenses may be formed of plastic, and the other lenses may be formed of glass. One of the lenses, formed of glass, is disposed between the stop and the imaging plane and has positive refractive power. The image capturing lens system, satisfying the above condition, may have constant optical characteristics even at a high temperature or a low temperature, and reduction in manufacturing cost and weight lightening may be implemented.

The image capturing lens system is configured to satisfy at least one of the Conditional Expressions below.

| | |
|---|---|
| $Gf/f<2.0$ | Conditional Expression 1 |
| $0.7<BFL/S8S13$ | Conditional Expression 2 |
| $D34<D23$ | Conditional Expression 3 |
| $D45<D34$ | Conditional Expression 4 |
| $f3/f<2.0$ | Conditional Expression 5 |
| $f4/f<2.0$ | Conditional Expression 6 |
| $TL/f<5.0$ | Conditional Expression 7 |

In the Conditional Expressions, "f" is a focal length of the image capturing lens system, "Gf" is a focal length of a lens, among the third to sixth lenses, formed of glass and disposed closest to an object side, "BFL" is a distance from the image-side surface of the sixth lens to the imaging plane, "S8S13" is a distance from the object-side surface of the fourth lens to the image-side surface of the sixth lens, "f2" is a focal length of the third lens, "f4" is a focal length of the fourth lens, and "TL" is a distance from the object-side surface of the first lens to the imaging plane.

In the descriptions below, an image capturing lens system according to various examples will be described.

An image capturing lens system 100 according to a first example will be described with reference to FIG. 1.

The image capturing lens system 100 includes a plurality of a plurality of lenses, each having refractive power. For example, the image capturing lens system 100 includes a first lens 110, a second lens 120, a third lens 130, a fourth lens 140, a fifth lens 150, and a sixth lens 160.

The first lens 110 has negative refractive power, with a convex object-side surface and a concave image-side surface. The second lens 120 has positive refractive power, with a convex object-side surface and a convex image-side surface. The third lens 130 has positive refractive power, with a concave object-side surface and a convex image-side surface. The fourth lens 140 has positive refractive power, with a convex object-side surface and a convex image-side surface. The fifth lens 150 has negative refractive power, with a concave object-side surface and a concave image-side surface. The sixth lens 160 has positive refractive power, with a convex object-side surface and a convex image-side surface.

The image capturing lens system 100 includes a plurality of aspherical lenses. For example, the second lens 120, the third lens 130, the fifth lens 150, and the sixth lens 160 include aspherical surfaces.

The image capturing lens system 100 includes at least one lens, formed of glass, to perform constant optical performance in spite of temperature variations. In the example of FIG. 1, the first lens 110 and the fourth lens 140 are formed of glass, and the other lenses are formed of plastic.

The image capturing lens system 100 includes a stop ST. The stop ST is disposed between the second lens 120 and the third lens 130. The image capturing lens system 100 includes a filter 170 and a cover glass 180. The filter 170 is disposed between the sixth lens 160 and an imaging plane 190 to block infrared light, and the cover glass 180 blocks foreign objects.

In the image capturing lens system 100, TL is 14.00 mm and f is 3.20 mm.

Figure 2:
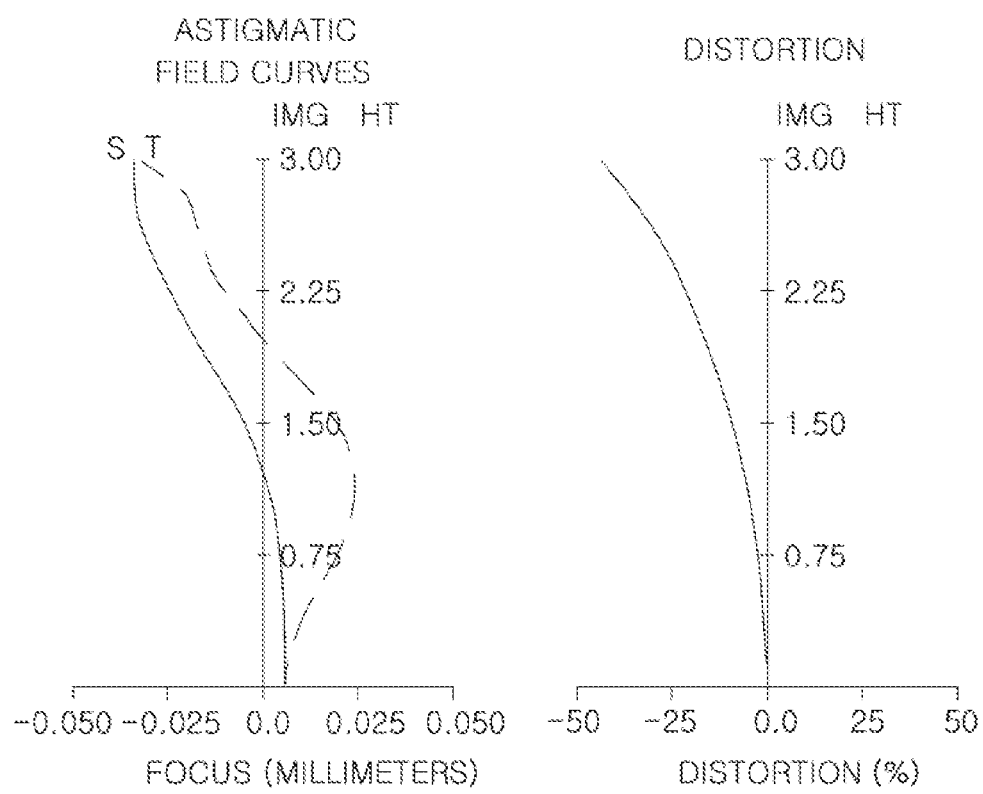
FIG. 2 illustrates aberration curves of the image capturing lens system illustrated in FIG. 1.
Figure 3:
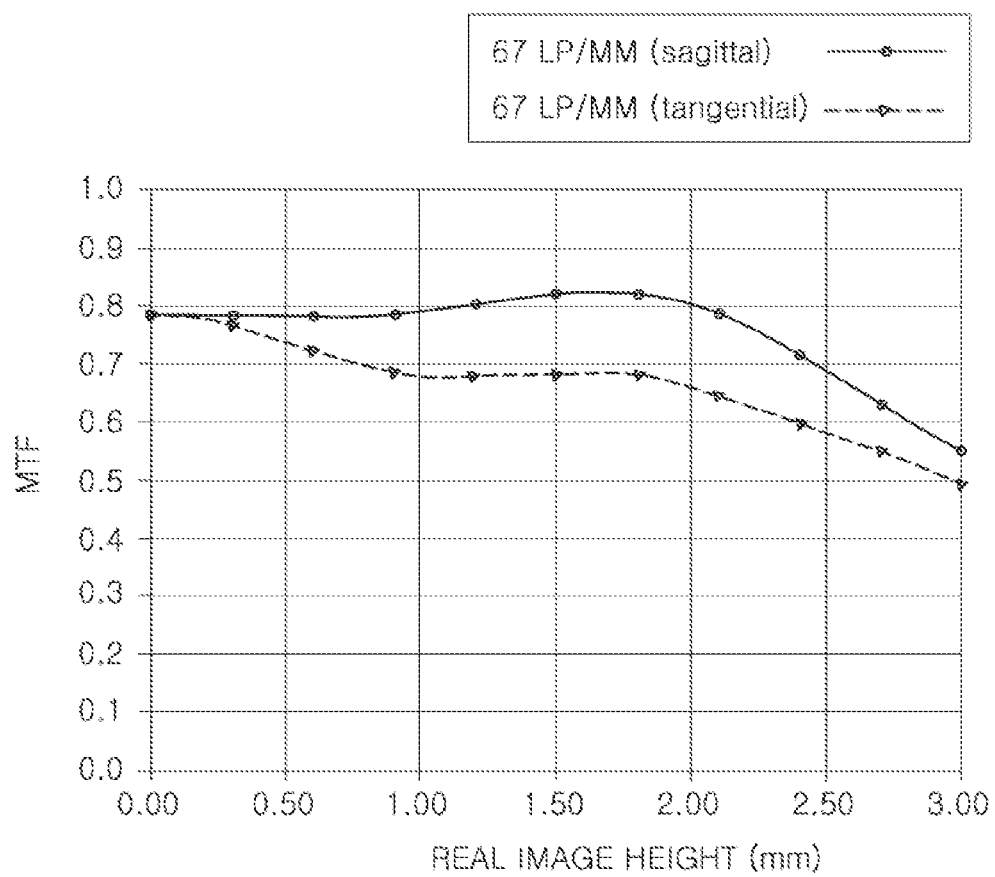
FIG. 3 illustrates MTF curves depending on temperature variations of the image capturing lens system illustrated in FIG. 1.

Table (1) lists lens characteristics of the image capturing lens system 100, Table (2) lists aspherical constants, and Table (3) lists a focal length and a coefficient of linear thermal expansion (CTE) of each lens. FIG. 2 illustrates aberration curves of the image capturing lens system 100, and FIG. 3 is a graph illustrating MTF characteristics of the image capturing lens system 100.

TABLE 1

| Surface No. | Note | Radius of Curvature | Thickness/ Distance | Refractive Index | Abbe No. |
|---|---|---|---|---|---|
| 1 | First Lens | 17.113 | 0.4 | 1.7725 | 49.62 |
| 2 | | 2.167 | 0.908 | | |
| 3 | Second Lens | 14.248 | 0.851 | 1.6612 | 20.35 |
| 4 | | −17.422 | 0.962 | | |
| 5 | Stop | Infinity | 0.225 | | |
| 6 | Third Lens | −4.909 | 1.431 | 1.5345 | 55.68 |
| 7 | | −3.273 | 0.1 | | |
| 8 | Fourth Lens | 6.025 | 1.574 | 1.7433 | 49.4 |
| 9 | | −7.126 | 0.238 | | |
| 10 | Fifth Lens | −7.873 | 0.625 | 1.6428 | 22.4 |
| 11 | | 3.532 | 0.1 | | |
| 12 | Sixth Lens | 3.482 | 1.876 | 1.5345 | 55.68 |
| 13 | | −6.445 | 0.5 | | |
| 14 | Filter | Infinity | 0.4 | 1.5168 | 64.17 |
| 15 | | Infinity | 3.263 | | |
| 16 | Cover Glass | Infinity | 0.4 | 1.5168 | 64.17 |
| 17 | | Infinity | 0.15 | | |
| 18 | Imaging Plane | Infinity | −0.006 | | |

TABLE 2

| Surface No. | K | A | B | C | D |
|---|---|---|---|---|---|
| 3 | −0.984959 | −0.004207 | 0.000373 | −0.000353 | 0 |
| 4 | 18.400288 | 0.002266 | −0.00016 | 0 | 0 |
| 6 | 5.680808 | 0.015847 | 0.001601 | −0.000682 | 0.000239 |
| 7 | 0.140001 | 0.006007 | −0.000822 | −0.000002 | 0 |
| 10 | 0.075623 | 0.001234 | −0.001957 | 0.000277 | −0.000013 |
| 11 | −0.961879 | −0.023497 | 0.006347 | −0.000885 | 0.000048 |
| 12 | −1.913323 | −0.024659 | 0.007334 | −0.000952 | 0.000044 |
| 13 | −11.54384 | −0.002763 | 0.000054 | 0.000084 | −0.00001 |

TABLE 3

| Note | Material | Focal Length | CTE(ppm) |
|---|---|---|---|
| First Lens | Glass | −3.23428 | 8 |
| Second Lens | Plastic | 11.84906 | 66 |
| Third Lens | Plastic | 14.007636 | 60 |
| Fourth Lens | Glass | 4.606795 | 8 |
| Fifth Lens | Plastic | −3.675012 | 71 |
| Sixth Lens | Plastic | 4.50912 | 60 |

Figure 4:
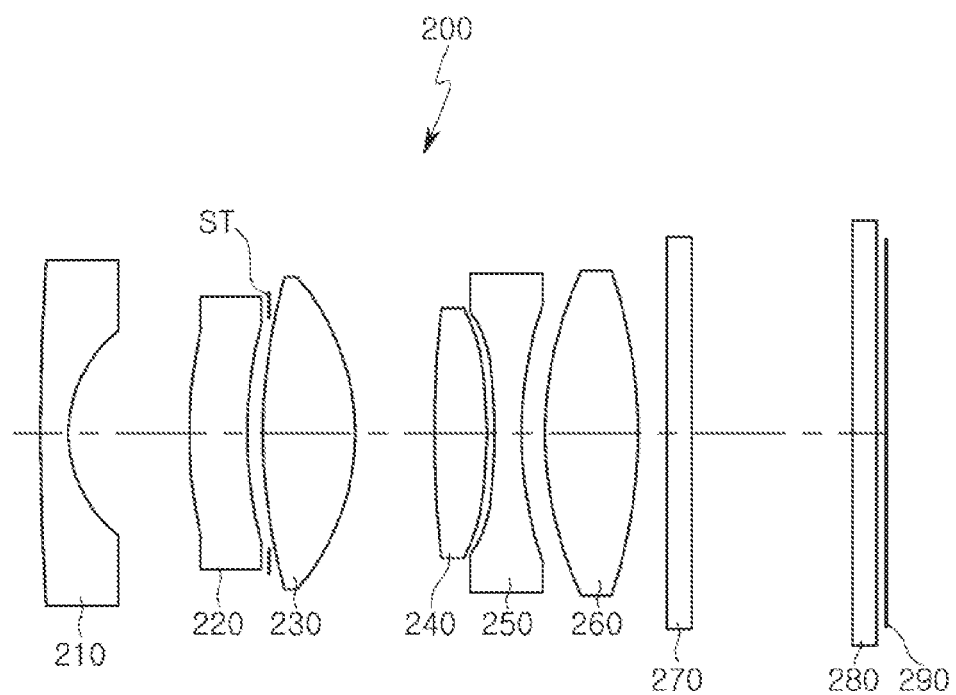
FIG. 4 illustrates a configuration of an image capturing lens system according to a second example.

Hereinafter, an image capturing lens system 200 according to a second example will be described with reference to FIG. 4.

The image capturing lens system 200 includes a plurality of lenses, each having refractive power. For example, the image capturing lens system 200 includes a first lens 210, a second lens 220, a third lens 230, a fourth lens 240, a fifth lens 250, and a sixth lens 260.

The first lens 210 has negative refractive power, with a convex object-side surface and a concave image-side surface. The second lens 220 has positive refractive power, with a convex object-side surface and a concave image-side surface. The third lens 230 has positive refractive power, with a convex object-side surface and a convex image-side surface. The fourth lens 240 has positive refractive power, with a convex object-side surface and a convex image-side surface. The fifth lens 250 has negative refractive power, with a concave object-side surface and a concave image-side surface. The sixth lens 260 has positive refractive power, with a convex object-side surface and a convex image-side surface.

The image capturing lens system 200 includes a plurality of aspherical lenses. For example, the second lens 220, the third lens 230, the fourth lens 240, the fifth lens 250, and the sixth lens 260 include aspherical surfaces.

The image capturing lens system 200 includes at least one lens, formed of glass, to perform constant optical performance in spite of temperature variations. In the example of FIG. 4, the first lens 210 and the third lens 230 are formed of glass, and the other lenses are formed of plastic.

The image capturing lens system 200 includes a stop ST. The stop ST is disposed between the second lens 220 and the third lens 230. The image capturing lens system 200 includes a filter 270 and a cover glass 280. The filter 270 is disposed between the sixth lens 260 and an imaging plane 290 to block infrared light, and the cover glass 280 blocks foreign objects.

In the image capturing lens system 200, TL is 14.00 mm and f is 3.20 mm.

Figure 5:
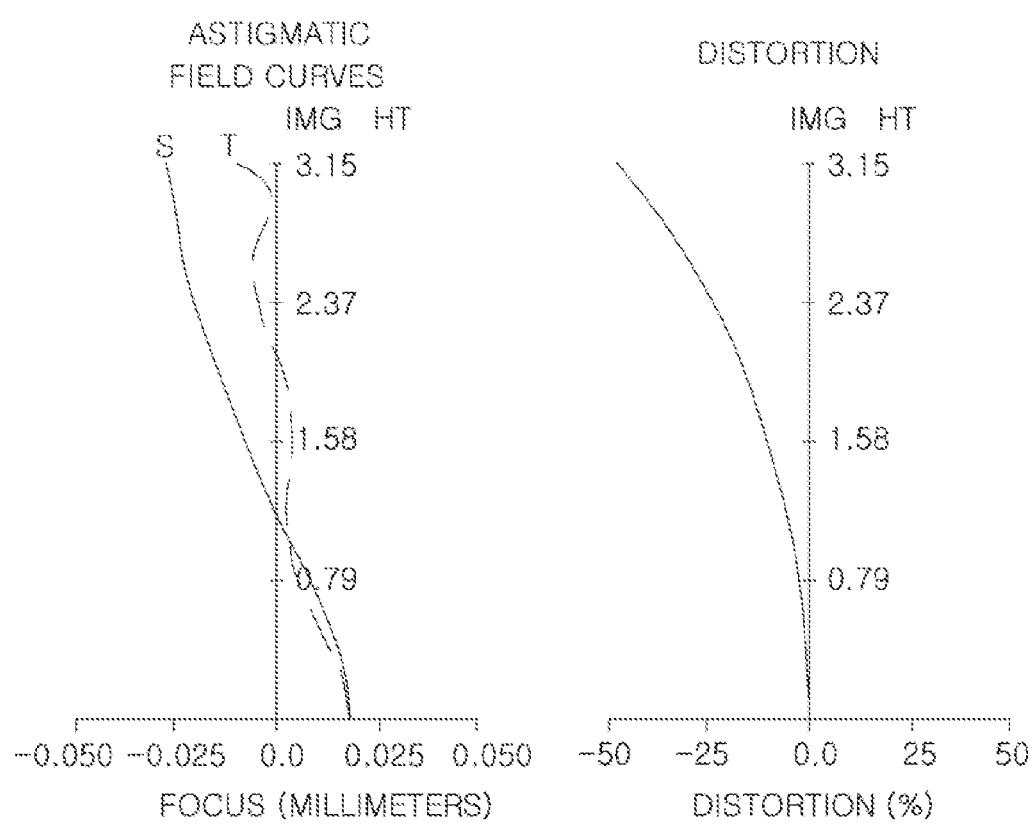
FIG. 5 illustrates aberration curves of the image capturing lens system illustrated in FIG. 4.
Figure 6:
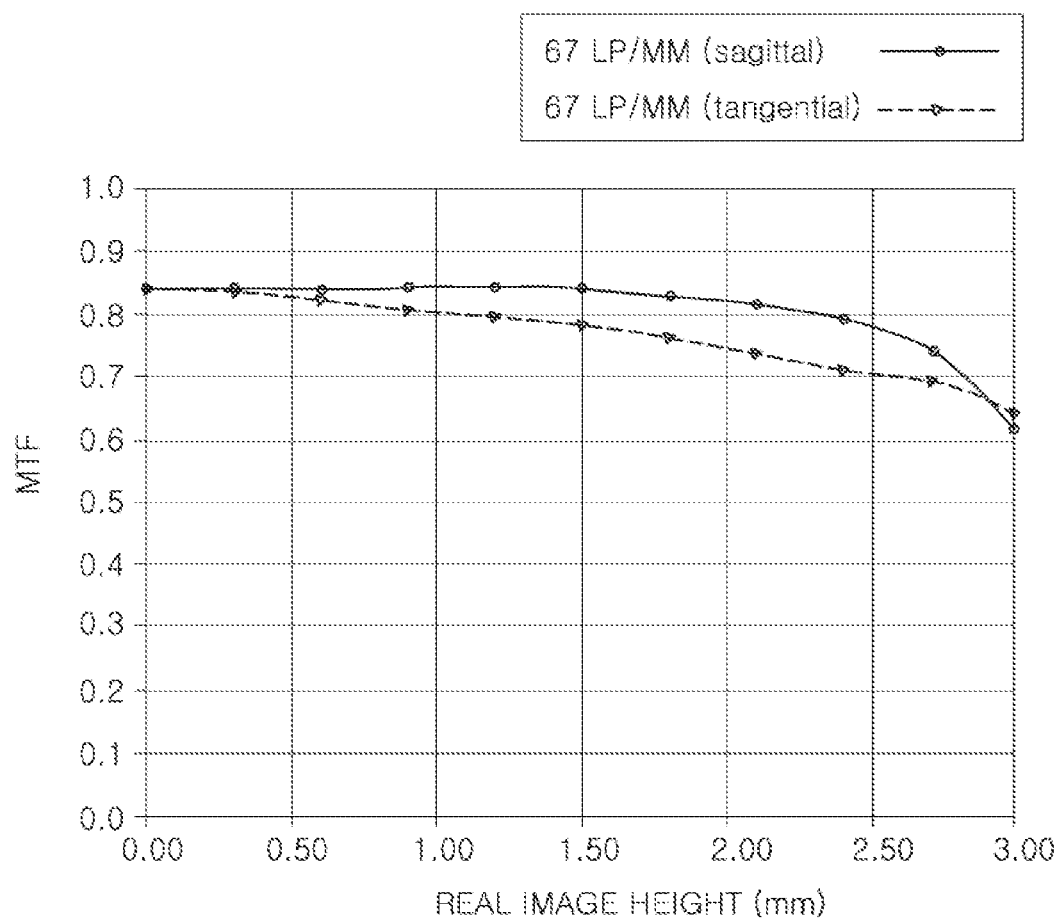
FIG. 6 illustrates MTF curves depending on temperature variations of the image capturing lens system illustrated in FIG. 4.

Table (4) lists lens characteristics of the image capturing lens system 200, Table (5) lists aspherical constants, and Table (6) lists a focal length and a coefficient of linear thermal expansion (CTE) of each lens. FIG. 5 illustrates aberration curves of the image capturing lens system 200, and FIG. 6 is a graph illustrating MTF characteristics of the image capturing lens system 200.

TABLE 4

| Surface No. | Note | Radius of Curvature | Thickness/ Distance | Refractive Index | Abbe No. |
|---|---|---|---|---|---|
| 1 | First Lens | 56.928 | 0.44 | 1.7725 | 49.62 |
| 2 | | 2.144 | 1.992 | | |
| 3 | Second Lens | 6.165 | 0.973 | 1.6612 | 20.35 |
| 4 | | 6.799 | 0.357 | | |
| 5 | Stop | Infinity | −0.107 | | |
| 6 | Third Lens | 8.707 | 1.559 | 1.755 | 52.3 |
| 7 | | −3.864 | 1.302 | | |
| 8 | Fourth Lens | 17.83 | 0.868 | 1.5348 | 55.72 |
| 9 | | −11.668 | 0.147 | | |
| 10 | Fifth Lens | −8.12 | 0.43 | 1.6612 | 20.35 |
| 11 | | 5.421 | 0.368 | | |
| 12 | Sixth Lens | 3.671 | 1.547 | 1.5348 | 55.72 |
| 13 | | −10.687 | 0.5 | | |
| 14 | Filter | Infinity | 0.4 | 1.5168 | 64.17 |
| 15 | | Infinity | 2.675 | | |
| 16 | Cover Glass | Infinity | 0.4 | 1.5168 | 64.17 |
| 17 | | Infinity | 0.15 | | |
| 18 | Imaging Plane | Infinity | 0 | | |

TABLE 5

| Surface No. | K | A | B | C |
|---|---|---|---|---|
| 3 | −1.91777 | −0.00201 | −0.00067 | 0.000043 |
| 4 | 0.92986 | 0.000943 | −0.00042 | 0.000042 |
| 8 | −54.8172 | −0.00195 | 0.000545 | −1.90E−05 |
| 9 | 22.54924 | −0.00936 | 0.00013 | 0.000039 |
| 10 | 6.951181 | −0.00204 | −0.00157 | — |
| 11 | −25.8172 | 0.005009 | −8.20E−05 | −3.60E−05 |
| 12 | −8.66933 | −0.00372 | 0.000858 | −3.10E−05 |
| 13 | 1.441256 | −0.00211 | −0.00037 | 0.000066 |

TABLE 6

| Note | Material | Focal Length | CTE(ppm) |
|---|---|---|---|
| First Lens | Glass | −2.879873 | 8 |
| Second Lens | Plastic | 61.251329 | 66 |
| Third Lens | Glass | 3.727968 | 8 |
| Fourth Lens | Plastic | 13.26758 | 60 |
| Fifth Lens | Plastic | −4.800192 | 66 |
| Sixth Lens | Plastic | 5.286187 | 60 |

Figure 7:
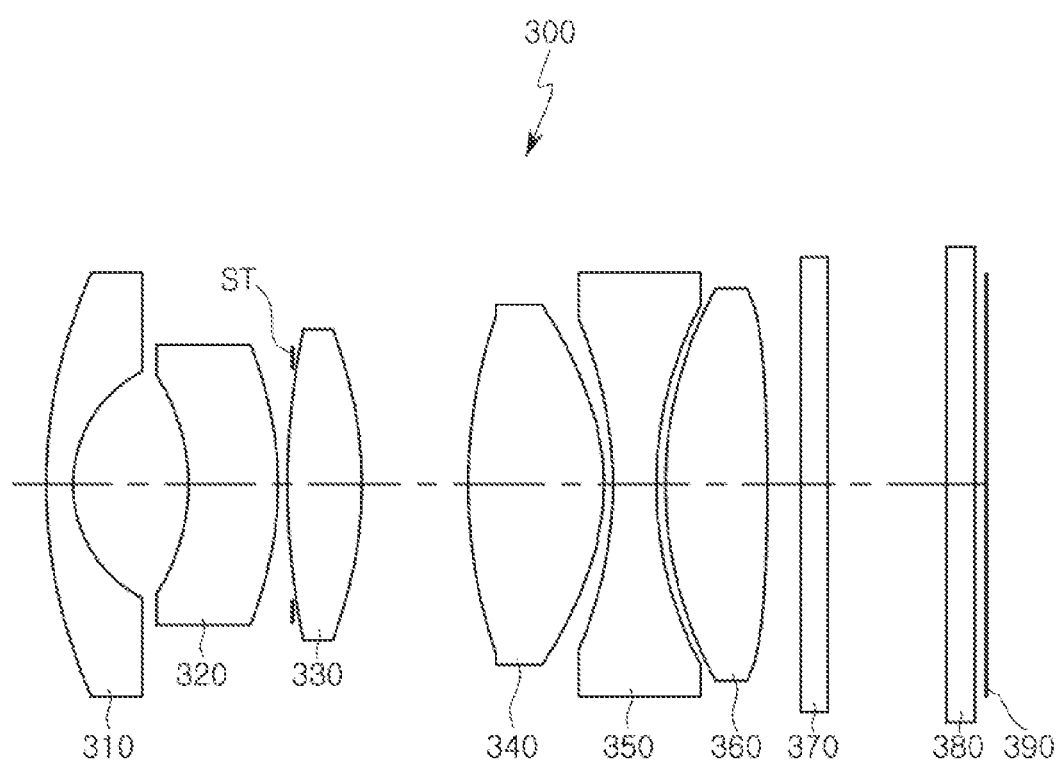
FIG. 7 illustrates a configuration of an image capturing lens system according to a third example.

An image capturing lens system 300 according to a third example will be described with reference to FIG. 7.

The image capturing lens system 300 includes a plurality of lenses, each having refractive power. For example, the image capturing lens system 300 includes a first lens 310, a second lens 320, a third lens 330, a fourth lens 340, a fifth lens 350, and a sixth lens 360.

The first lens 310 has negative refractive power, with a convex object-side surface and a concave image-side surface. The second lens 320 has negative refractive power, with a concave object-side surface and a convex image-side surface. The third lens 330 has positive refractive power, with a convex object-side surface and a convex image-side surface. The fourth lens 340 has positive refractive power, with a convex object-side surface and a convex image-side surface. The fifth lens 350 has negative refractive power, with a concave object-side surface and a concave image-side surface. The sixth lens 360 has positive refractive power, with a convex object-side surface and a concave image-side surface.

The image capturing lens system 300 includes a plurality of aspherical lenses. For example, the first lens 310, the second lens 320, the fourth lens 340, the fifth lens 350, and the sixth lens 360 include aspherical surfaces.

The image capturing lens system 300 includes a lens, formed of glass, to perform constant optical performance in spite of temperature variations. In the example of FIG. 7, the third lens 330 is formed of glass, and the other lenses are formed of plastic.

The image capturing lens system 300 includes a stop ST. The stop ST is disposed between the second lens 320 and the third lens 330. The image capturing lens system 300 includes a filter 370 and a cover glass 380. The filter 370 is disposed between the sixth lens 360 and an imaging plane 390 to block infrared light, and the cover glass 380 blocks foreign objects.

In the image capturing lens system 300, TL is 14.00 mm and f is 3.244 mm.

Figure 8:
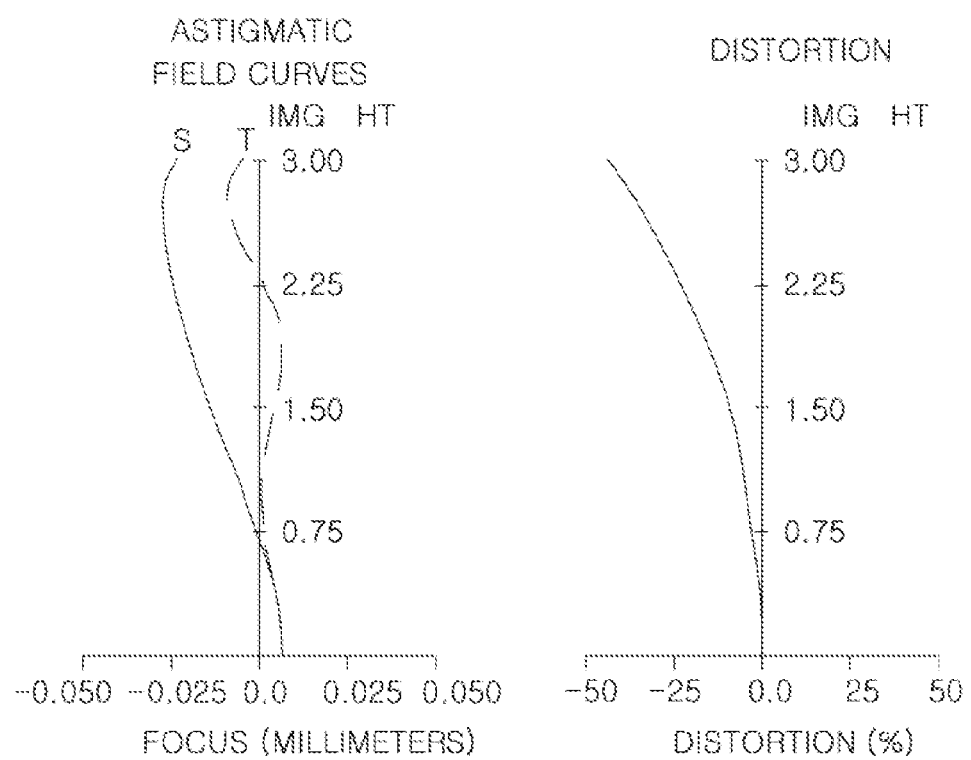
FIG. 8 illustrates aberration curves of the image capturing lens system illustrated in FIG. 7.
Figure 9:
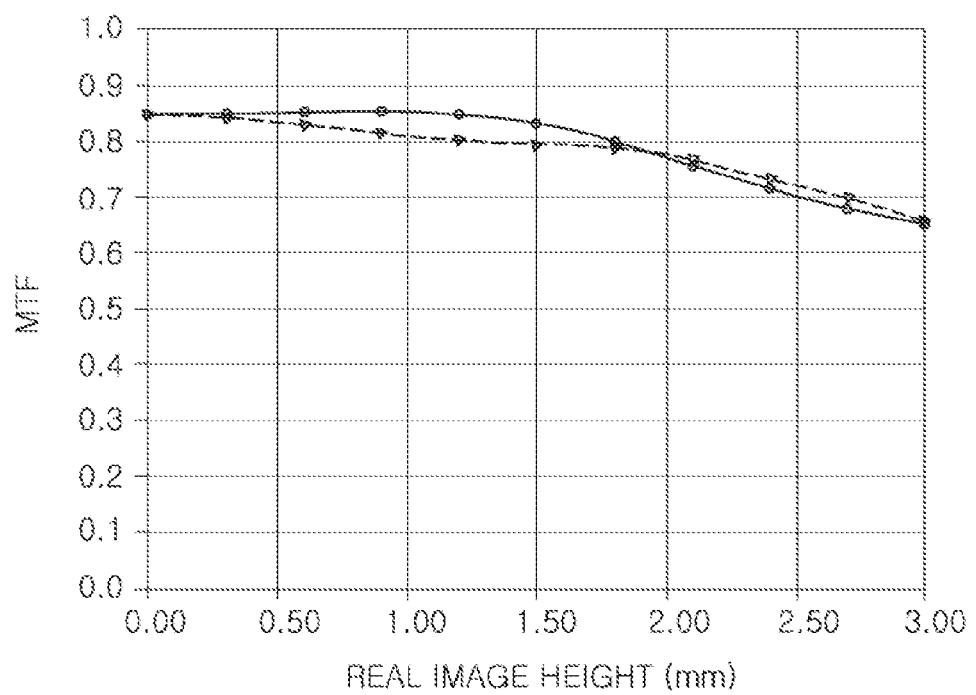
FIG. 9 illustrates MTF curves depending on temperature variations of the image capturing lens system illustrated in FIG. 7.

Table (7) lists lens characteristics of the image capturing lens system 300, Table (8) lists aspherical constants, and Table (9) lists a focal length and a coefficient of linear thermal expansion (CTE) of each lens. FIG. 8 illustrates aberration curves of the image capturing lens system 300, and FIG. 9 is a graph illustrating MTF characteristics of the image capturing lens system 300.

TABLE 7

| Surface No. | Note | Radius of Curvature | Thickness/ Distance | Refractive Index | Abbe No. |
|---|---|---|---|---|---|
| 1 | First Lens | 7.045 | 0.4 | 1.5348 | 55.72 |
| 2 | | 1.938 | 1.725 | | |
| 3 | Second Lens | −3.044 | 1.382 | 1.6612 | 20.35 |
| 4 | | −4.628 | 0.179 | | |
| 5 | Stop | Infinity | −0.079 | | |
| 6 | Third Lens | 11.199 | 1.121 | 1.6968 | 55.41 |
| 7 | | −6.137 | 1.56 | | |

TABLE 7-continued

| Surface No. | Note | Radius of Curvature | Thickness/ Distance | Refractive Index | Abbe No. |
|---|---|---|---|---|---|
| 8 | Fourth Lens | 8.442 | 2.055 | 1.5348 | 55.72 |
| 9 | | −2.953 | 0.1 | | |
| 10 | Fifth Lens | −9.796 | 0.653 | 1.6612 | 20.35 |
| 11 | | 4.95 | 0.1 | | |
| 12 | Sixth Lens | 4.897 | 1.568 | 1.5348 | 55.72 |
| 13 | | 34.953 | 0.5 | | |
| 14 | Filter | Infinity | 0.4 | 1.5168 | 64.17 |
| 15 | | Infinity | 1.786 | | |
| 16 | Cover Glass | Infinity | 0.4 | 1.5168 | 64.17 |
| 17 | | Infinity | 0.15 | | |
| 18 | Imaging Plane | Infinity | 0 | | |

TABLE 8

| Surface No. | K | A | B | C | D |
|---|---|---|---|---|---|
| 1 | −7.681703 | 0.002013 | −0.000288 | 0.000025 | — |
| 2 | 0.061406 | −0.000388 | 0.000518 | −0.000389 | — |
| 3 | 0.5422 | 0.004976 | 0.000134 | — | — |
| 4 | −0.211763 | 0.002146 | −0.000167 | — | — |
| 8 | −22.17865 | 0.007454 | −0.000645 | 0.000011 | — |
| 9 | −2.361881 | 0.001728 | −0.000264 | 0.000014 | — |
| 10 | 3.825378 | −0.00665 | −0.000113 | 0.000164 | −0.000011 |
| 11 | −1.851574 | −0.00174 | −0.000081 | 0.000118 | −0.000009 |
| 12 | −1.778214 | 0.00078 | −0.000226 | 0.000012 | — |
| 13 | 0.96103 | −0.011395 | 0.001474 | −0.00014 | 0.000005 |

TABLE 9

| Note | Material | Focal Length | CTE(ppm) |
|---|---|---|---|
| First Lens | Plastic | −5.118755 | 60 |
| Second Lens | Plastic | −20.45832 | 66 |
| Third Lens | Glass | 5.820223 | 8 |
| Fourth Lens | Plastic | 4.347073 | 60 |
| Fifth Lens | Plastic | −4.83182 | 66 |
| Sixth Lens | Plastic | 10.414383 | 60 |

Figure 10:
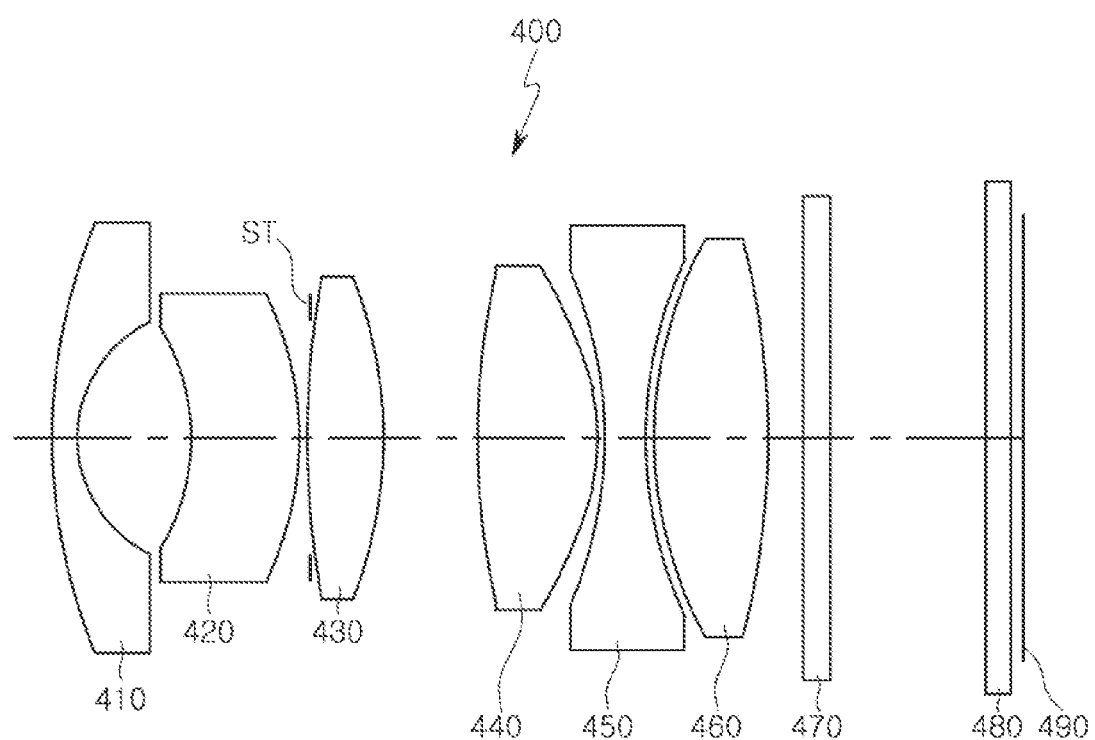
FIG. 10 illustrates a configuration of an image capturing lens system according to a fourth example.

An image capturing lens system 400 according to a fourth example will be described with reference to FIG. 10.

The image capturing lens system 400 includes a plurality of lenses, each having refractive power. For example, the image capturing lens system 400 includes a first lens 410, a second lens 420, a third lens 430, a fourth lens 440, a fifth lens 450, and a sixth lens 460.

The first lens 410 has negative refractive power, with a convex object-side surface and a concave image-side surface. The second lens 420 has negative refractive power, with a concave object-side surface and a convex image-side surface. The third lens 430 has positive refractive power, with a convex object-side surface and a convex image-side surface. The fourth lens 440 has positive refractive power, with a convex object-side surface and a convex image-side surface. The fifth lens 450 has negative refractive power, with a concave object-side surface and a concave image-side surface. The sixth lens 460 has positive refractive power, with a convex object-side surface and a convex image-side surface.

The image capturing lens system 400 includes a plurality of aspherical lenses. For example, the first lens 410, the second lens 420, the fourth lens 440, the fifth lens 450, and the sixth lens 460 include aspherical surfaces.

The image capturing lens system 400 includes a lens, formed of glass, to perform constant optical performance in spite of temperature variations. In the example of FIG. 10, the third lens 430 is formed of glass, and the other lenses are formed of plastic.

The image capturing lens system 400 includes a stop ST. The stop ST is disposed between the second lens 420 and the third lens 430. The image capturing lens system 400 includes a filter 470 and a cover glass 480. The filter 470 is disposed between the sixth lens 460 and an imaging plane 490 to block infrared light, and the cover glass 480 blocks foreign objects.

In the image capturing lens system 400, TL is 14.00 mm and f is 3.23 mm.

Figure 11:
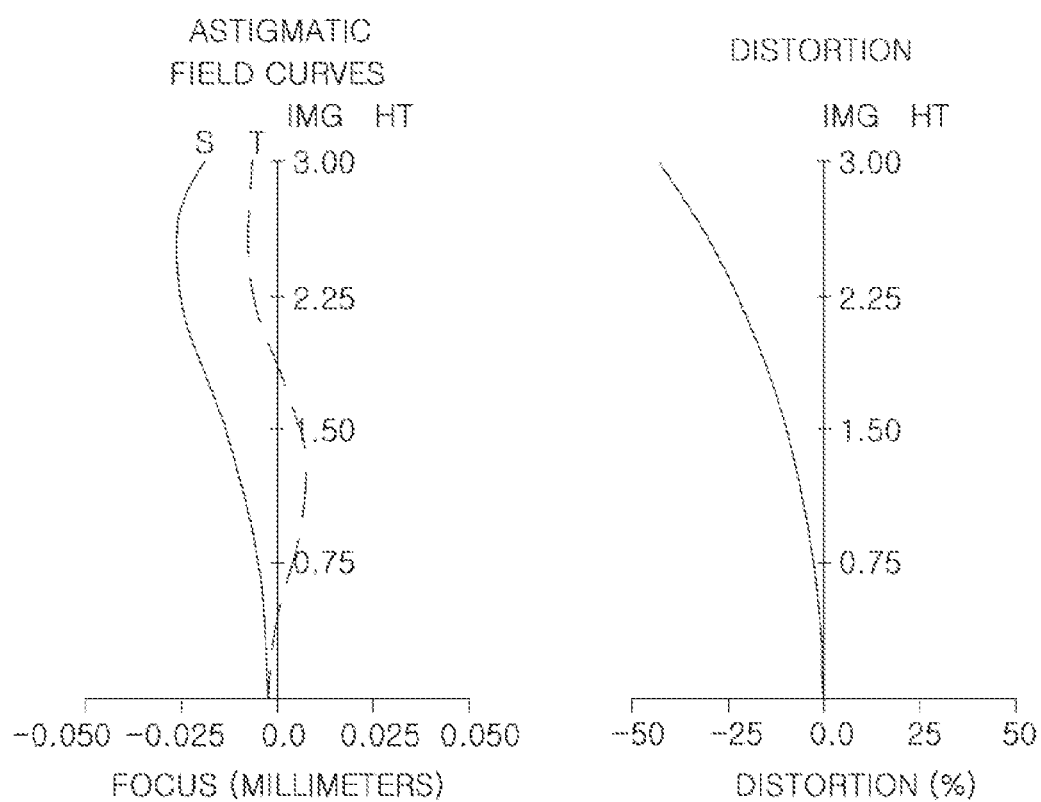
FIG. 11 illustrates aberration curves of the image capturing lens system illustrated in FIG. 10.
Figure 12:
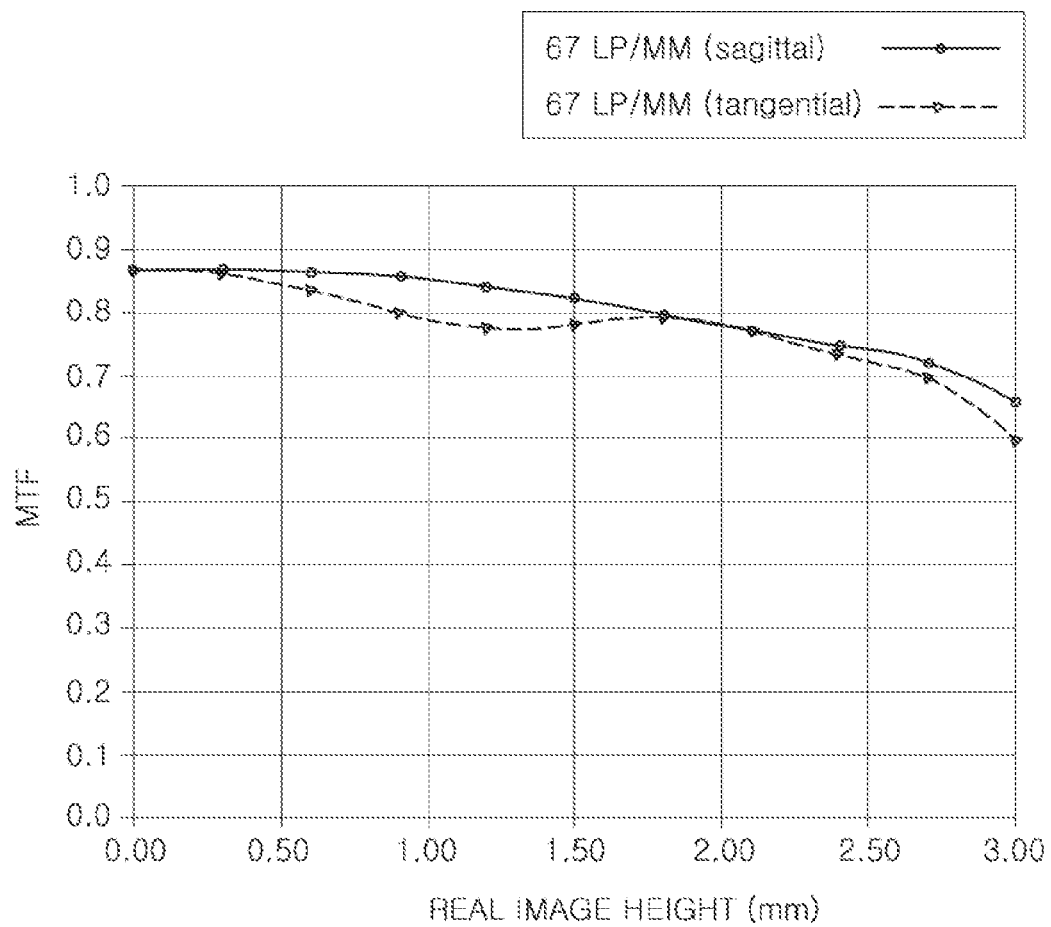
FIG. 12 illustrates MTF curves depending on temperature variations of the image capturing lens system illustrated in FIG. 10.

Table (10) lists lens characteristics of the image capturing lens system 400, Table (11) lists aspherical constants, and Table (12) lists a focal length and a coefficient of linear thermal expansion (CTE) of each lens. FIG. 11 illustrates aberration curves of the image capturing lens system 400, and FIG. 12 is a graph illustrating MTF characteristics of the image capturing lens system 400.

TABLE 10

| Surface No. | Note | Radius of Curvature | Thickness/ Distance | Refractive Index | Abbe No. |
|---|---|---|---|---|---|
| 1 | First Lens | 6.604 | 0.4 | 1.5348 | 55.72 |
| 2 | | 1.878 | 1.625 | | |
| 3 | Second Lens | −3.112 | 1.562 | 1.6612 | 20.35 |
| 4 | | −4.327 | 0.172 | | |
| 5 | Stop | Infinity | −0.072 | | |
| 6 | Third Lens | 12.201 | 1.119 | 1.6968 | 55.41 |
| 7 | | −6.172 | 1.342 | | |
| 8 | Fourth Lens | 18.042 | 1.746 | 1.5348 | 55.72 |
| 9 | | −2.939 | 0.1 | | |
| 10 | Fifth Lens | −7.26 | 0.593 | 1.6612 | 20.35 |
| 11 | | 6.556 | 0.1 | | |
| 12 | Sixth Lens | 5.226 | 1.649 | 1.5348 | 55.72 |
| 13 | | −38.415 | 0.5 | | |
| 14 | Filter | Infinity | 0.4 | 1.5168 | 64.17 |
| 15 | | Infinity | 0.1 | | |
| 16 | Cover Glass | Infinity | 0.4 | 1.5168 | 64.17 |
| 17 | | Infinity | 2.262 | | |
| 18 | Imaging Plane | Infinity | 0.002 | | |

TABLE 11

| Surface No. | K | A | B | C |
|---|---|---|---|---|
| 1 | −7.681703 | 0.001478 | −0.000152 | 0.000011 |
| 2 | 0.061406 | −0.000781 | 0.000079 | −0.000256 |
| 3 | 0.5422 | 0.004871 | 0.000294 | 0 |
| 4 | −0.211763 | 0.003197 | −0.000192 | 0 |
| 8 | −22.17865 | 0.006723 | −0.000393 | −0.000016 |
| 9 | −2.361881 | 0.000913 | −0.000116 | −0.000004 |
| 10 | 3.825378 | −0.003579 | 0.000122 | 0.000049 |
| 11 | −1.851574 | −0.000421 | 0.000531 | −0.000031 |
| 12 | −1.778214 | 0.000251 | 0.000062 | −0.000009 |
| 13 | 0.96103 | −0.007494 | 0.00069 | −0.000033 |

TABLE 12

| Note | Material | Focal Length | CTE(ppm) |
|---|---|---|---|
| First Lens | Plastic | −5.036333 | 60 |
| Second lens | Plastic | −34.20897 | 66 |
| Third Lens | Glass | 6.0078 | 8 |
| Fourth Lens | Plastic | 4.846766 | 60 |
| Fifth Lens | Plastic | −5.064417 | 66 |
| Sixth Lens | Plastic | 8.679575 | 60 |

Figure 13:
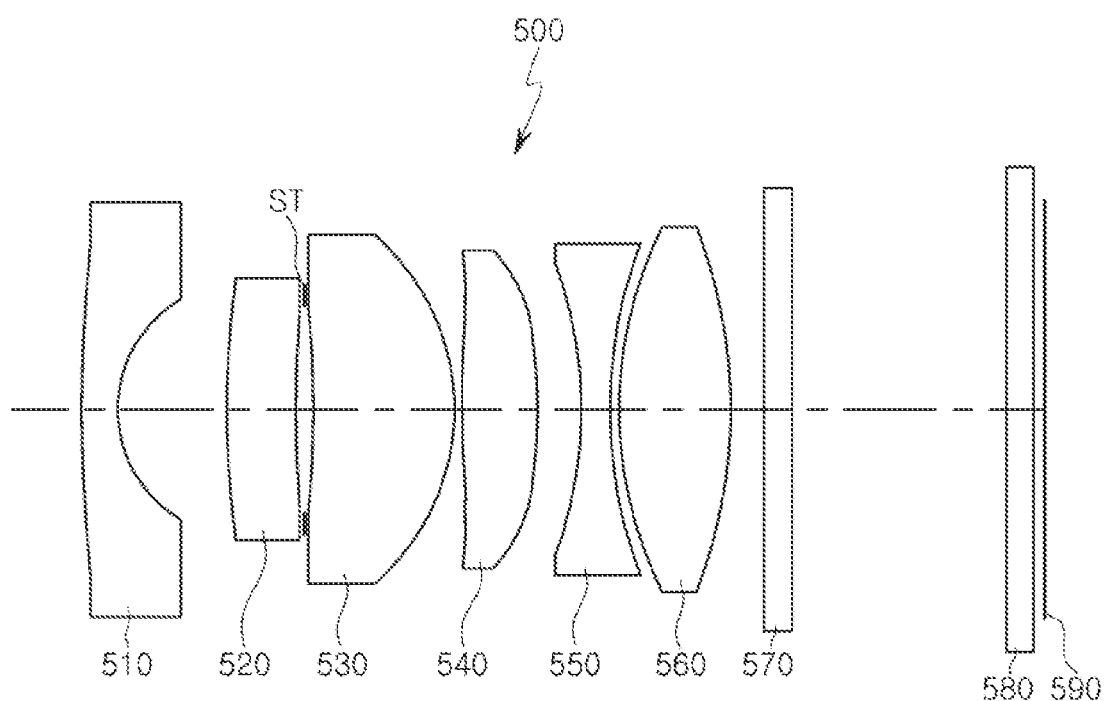
FIG. 13 illustrates a configuration of an image capturing lens system according to a fifth example.

An image capturing lens system 500 according to a fifth example will be described with reference to FIG. 13.

The image capturing lens system 500 includes a plurality of lenses, each having refractive power. For example, the image capturing lens system 500 includes a first lens 510, a second lens 520, a third lens 530, a fourth lens 540, a fifth lens 550, and a sixth lens 560.

The first lens 510 has negative refractive power, with a convex object-side surface and a concave image-side surface. The second lens 520 has positive refractive power, with a convex object-side surface and a concave image-side surface. The third lens 530 has positive refractive power, with a concave object-side surface and a convex image-side surface. The fourth lens 540 has positive refractive power, with a convex object-side surface and a convex image-side surface. The fifth lens 550 has negative refractive power, with a concave object-side surface and a concave image-side surface. The sixth lens 560 has positive refractive power, with a convex object-side surface and a convex image-side surface.

The image capturing lens system 500 includes a plurality of aspherical lenses. For example, the first lens 510, the second lens 520, the fourth lens 540, the fifth lens 550, and the sixth lens 560 include aspherical surfaces.

The image capturing lens system 500 includes a lens, formed of glass, to perform constant optical performance in spite of temperature variations. In the example of FIG. 13, the third lens 530 is formed of glass, and the other lenses are formed of plastic.

The image capturing lens system 500 includes a stop ST. The stop ST is disposed between the second lens 520 and the third lens 530. The image capturing lens system 500 includes a filter 570 and a cover glass 580. The filter 570 is disposed between the sixth lens 560 and an imaging plane 590 to block infrared light, and the cover glass 580 blocks foreign objects.

In the image capturing lens system 500, TL is 14.00 mm and f is 3.20 mm.

Figure 14:
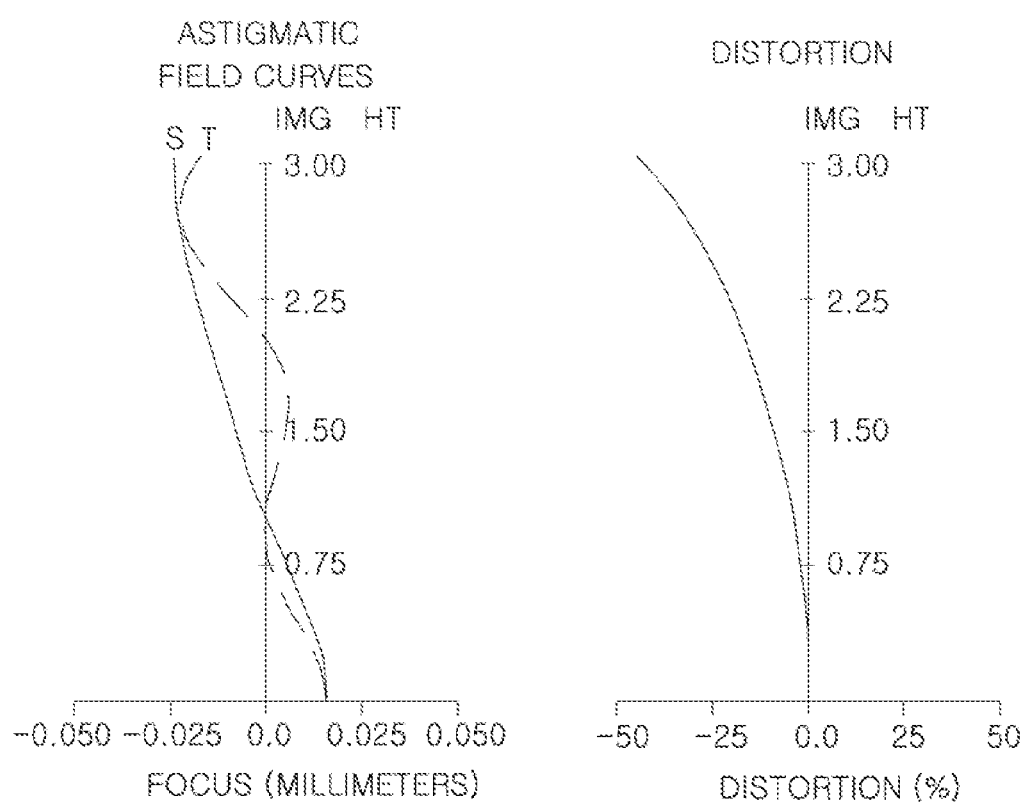
FIG. 14 illustrates aberration curves of the image capturing lens system illustrated in FIG. 13.
Figure 15:
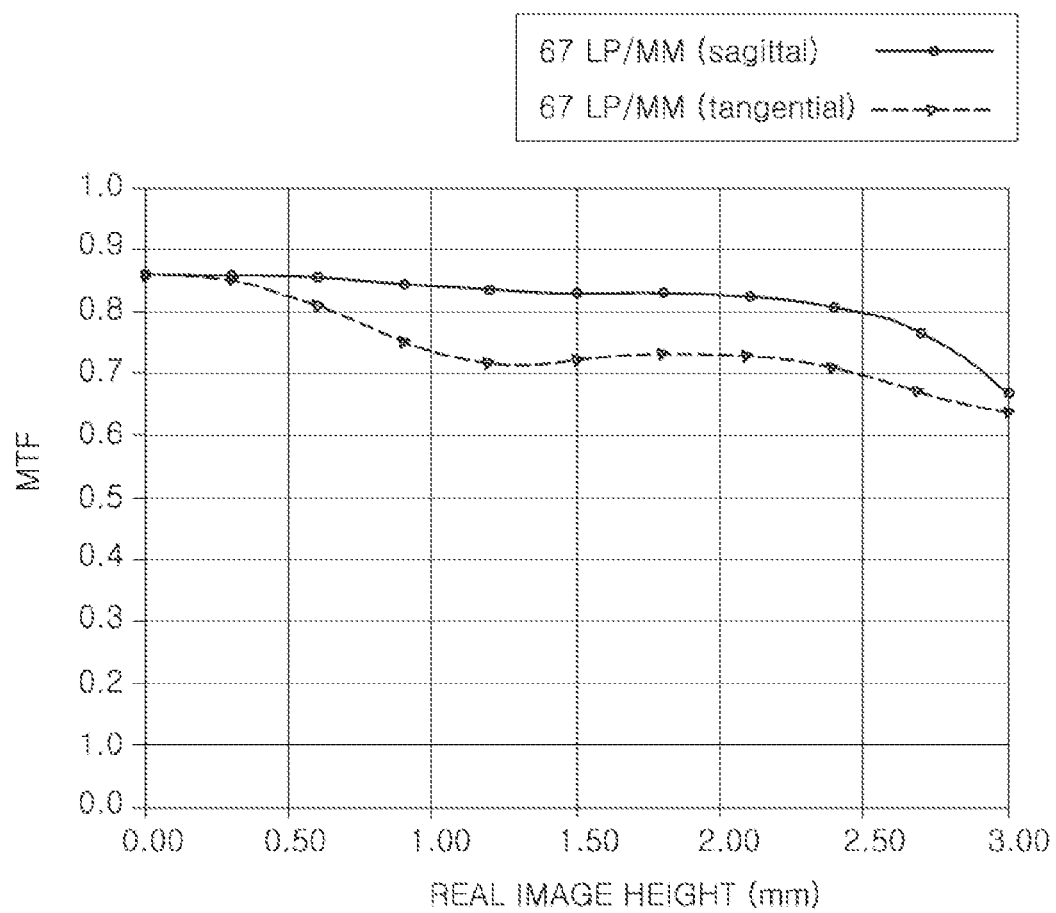
FIG. 15 illustrates MTF curves depending on temperature variations of the image capturing lens system illustrated in FIG. 13.

Table (13) lists lens characteristics of the image capturing lens system 500, Table (14) lists aspherical constants, and Table (15) lists a focal length and a coefficient of linear thermal expansion (CTE) of each lens. FIG. 14 illustrates aberration curves of the image capturing lens system 500, and FIG. 15 is a graph illustrating MTF characteristics of the image capturing lens system 500.

TABLE 13

| Surface No. | Note | Radius of Curvature | Thickness/ Distance | Refractive Index | Abbe No. |
|---|---|---|---|---|---|
| 1 | First Lens | 15.895 | 0.469 | 1.5348 | 55.72 |
| 2 | | 1.803 | 1.641 | | |
| 3 | Second Lens | 20 | 1 | 1.6612 | 20.35 |
| 4 | | 100.599 | 0.16 | | |
| 5 | Stop | Infinity | 0.1 | | |
| 6 | Third Lens | −13.344 | 2.05 | 1.755 | 52.3 |
| 7 | | −3.323 | 0.1 | | |
| 8 | Fourth Lens | 12.068 | 1.108 | 1.5348 | 55.72 |
| 9 | | −21.107 | 0.63 | | |
| 10 | Fifth Lens | −12.915 | 0.445 | 1.6612 | 20.35 |
| 11 | | 5.266 | 0.1 | | |
| 12 | Sixth Lens | 3.565 | 1.623 | 1.5348 | 55.72 |
| 13 | | −7.933 | 0.5 | | |
| 14 | Filter | Infinity | 0.4 | 1.5168 | 64.17 |
| 15 | | Infinity | 0.1 | | |
| 16 | Cover Glass | Infinity | 0.4 | 1.5168 | 64.17 |
| 17 | | Infinity | 3.193 | | |
| 18 | Imaging Plane | Infinity | −0.016 | | |

TABLE 14

| Surface No. | K | A | B | C |
|---|---|---|---|---|
| 1 | 0 | −0.002362 | 0.000071 | 0 |
| 2 | −0.070237 | −0.000027 | −0.000937 | 0 |
| 3 | −1.91777 | 0.000235 | −0.000089 | 0.000274 |
| 4 | 0.92986 | 0.006087 | 0.001455 | 0.000122 |
| 8 | −54.81723 | −0.00522 | 0.000173 | −0.000008 |
| 9 | 22.549235 | −0.027239 | 0.002578 | −0.000153 |
| 10 | 6.951181 | −0.009539 | 0.000136 | 0 |
| 11 | −25.81716 | 0.007946 | −0.001059 | 0.000042 |
| 12 | −8.669333 | −0.001414 | 0.000379 | −0.000014 |
| 13 | −24.61728 | −0.005844 | 0.00017 | 0.00002 |

TABLE 15

| Note | Material | Focal Length | CTE(ppm) |
|---|---|---|---|
| First Lens | Plastic | −3.830711 | 60 |
| Second Lens | Plastic | 37.146079 | 66 |
| Third Lens | Glass | 5.361336 | 8 |
| Fourth Lens | Plastic | 14.463942 | 60 |
| Fifth Lens | Plastic | −5.540073 | 66 |
| Sixth Lens | Plastic | 4.816803 | 60 |

Figure 16:
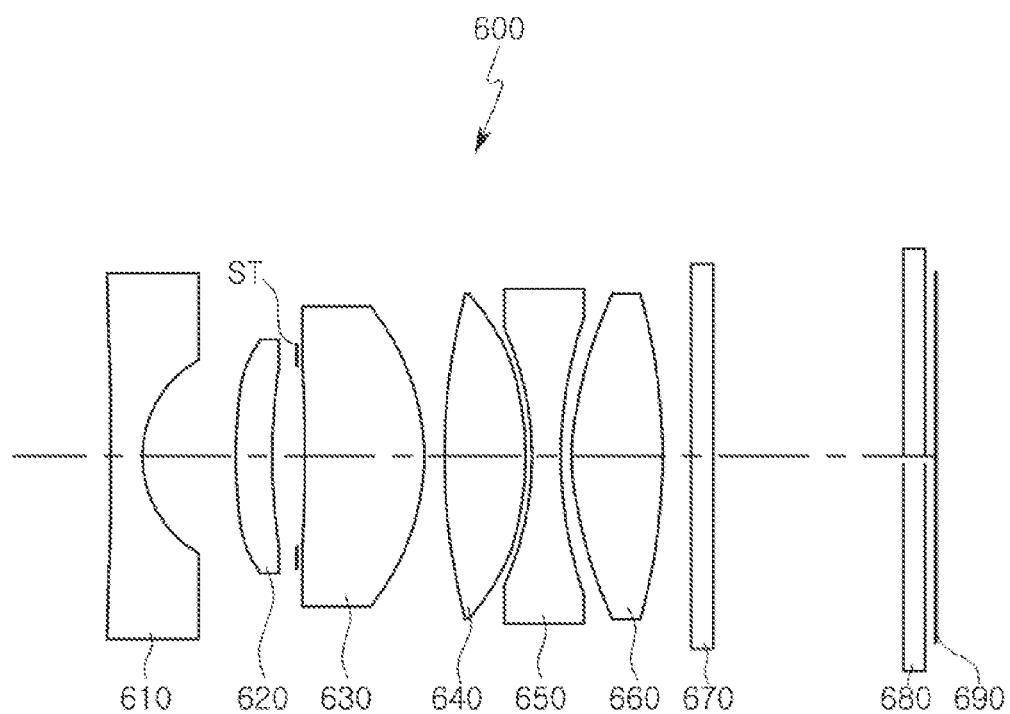
FIG. 16 illustrates a configuration of an image capturing lens system according to a sixth example.

An image capturing lens system 600 according to a sixth example will be described with reference to FIG. 16.

The image capturing lens system 600 includes a plurality of lenses, each having refractive power. For example, the image capturing lens system 600 includes a first lens 610, a second lens 620, a third lens 630, a fourth lens 640, a fifth lens 650, and a sixth lens 660.

The first lens 610 has negative refractive power, with a concave object-side surface and a concave image-side surface. The second lens 620 has positive refractive power, with a convex object-side surface and a concave image-side surface. The third lens 630 has positive refractive power, with a concave object-side surface and a convex image-side surface. The fourth lens 640 has positive refractive power, with a convex object-side surface and a convex image-side surface. The fifth lens 650 has negative refractive power, with a concave object-side surface and a concave image-side surface. The sixth lens 660 has positive refractive power, with a convex object-side surface and a convex image-side surface.

The image capturing lens system 600 includes a plurality of aspherical lenses. For example, the first lens 610, the second lens 620, the fourth lens 640, the fifth lens 650, and the sixth lens 660 include aspherical surfaces.

The image capturing lens system 600 includes a lens, formed of glass, to perform constant optical performance in spite of temperature variations. In the example of FIG. 16, the third lens 630 is formed of glass, and the other lenses are formed of plastic.

The image capturing lens system 600 includes a stop ST. The stop ST is disposed between the second lens 620 and the third lens 630. The image capturing lens system 600 includes a filter 670 and a cover glass 680. The filter 670 is disposed between the sixth lens 660 and an imaging plane 690 to block infrared light, and the cover glass 680 blocks foreign objects.

In the image capturing lens system 600, TL is 14.00 mm and f is 3.20 mm.

Figure 17:
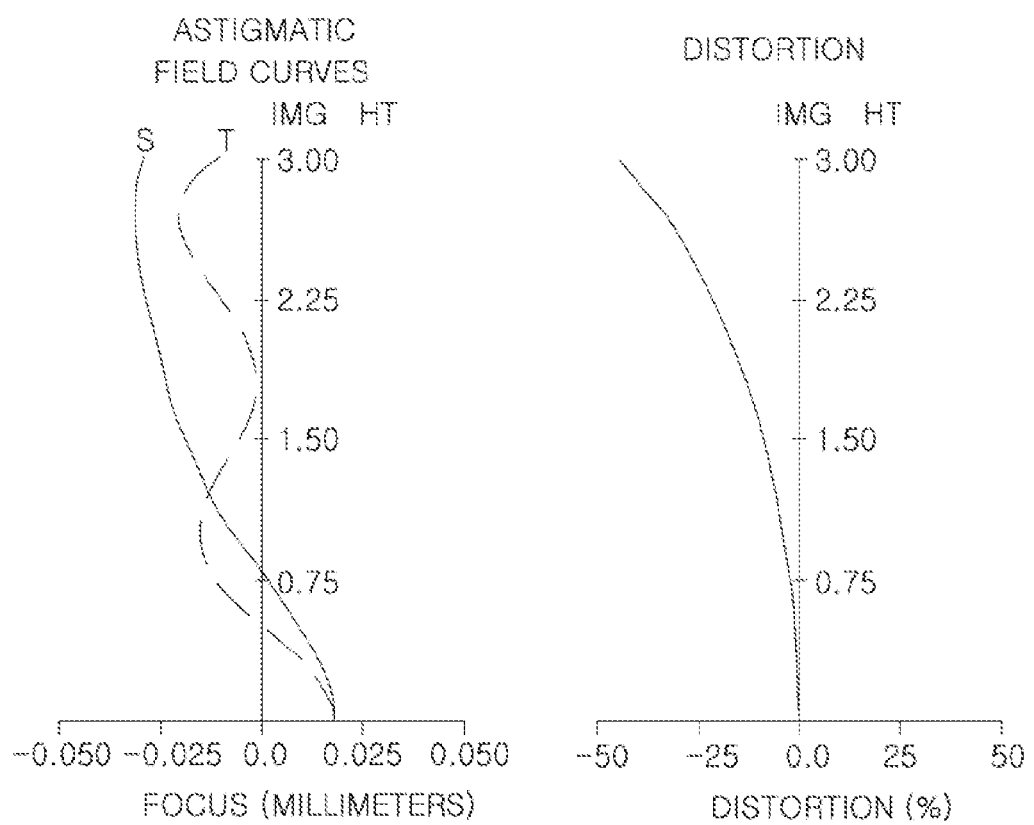
FIG. 17 illustrates aberration curves of the image capturing lens system illustrated in FIG. 16.
Figure 18:
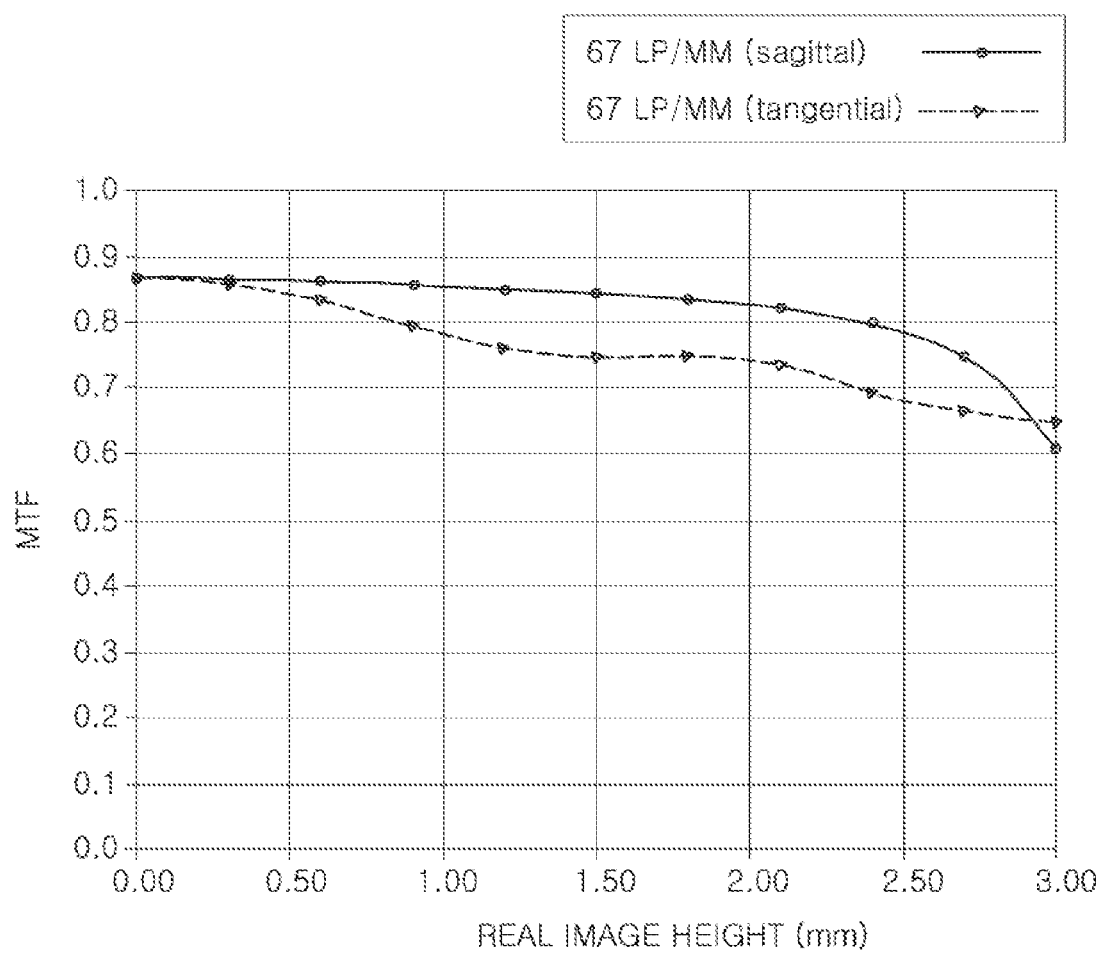
FIG. 18 illustrates MTF curves depending on temperature variations of the image capturing lens system illustrated in FIG. 16.

Table (16) lists lens characteristics of the image capturing lens system 600, Table (17) lists aspherical constants, and Table (18) lists a focal length and a coefficient of linear thermal expansion (CTE) of each lens. FIG. 17 illustrates aberration curves of the image capturing lens system 600, and FIG. 18 is a graph illustrating MTF characteristics of the image capturing lens system 600.

TABLE 16

| Surface No. | Note | Radius of Curvature | Thickness/ Distance | Refractive Index | Abbe No. |
|---|---|---|---|---|---|
| 1 | First Lens | −89.277 | 0.553 | 1.5348 | 55.72 |
| 2 | | 1.889 | 1.586 | | |
| 3 | Second Lens | 7.517 | 0.6 | 1.6612 | 20.35 |
| 4 | | 17.903 | 0.43 | | |
| 5 | Stop | Infinity | 0.129 | | |
| 6 | Third Lens | −50.109 | 2.013 | 1.755 | 52.3 |
| 7 | | −3.995 | 0.336 | | |
| 8 | Fourth Lens | 10.285 | 1.382 | 1.5348 | 55.72 |
| 9 | | −17.065 | 0.105 | | |
| 10 | Fifth Lens | −12.604 | 0.496 | 1.6612 | 20.35 |
| 11 | | 4.469 | 0.2 | | |
| 12 | Sixth Lens | 2.968 | 1.519 | 1.5348 | 55.72 |
| 13 | | −9.847 | 0.5 | | |
| 14 | Filter | Infinity | 0.4 | 1.5168 | 64.17 |
| 15 | | Infinity | 3.2 | | |
| 16 | Cover Glass | Infinity | 0.4 | 1.5168 | 64.17 |
| 17 | | Infinity | 0.17 | | |
| 18 | Imaging Plane | Infinity | −0.02 | | |

TABLE 17

| Surface No. | K | A | B | C |
|---|---|---|---|---|
| 1 | 0 | 0.000011 | −0.000032 | 0 |
| 2 | −0.070237 | −0.001152 | −0.00015 | 0 |
| 3 | −1.91777 | 0.001147 | −0.000301 | 0.000675 |
| 4 | 0.92986 | 0.004549 | −0.00026 | 0.000653 |
| 8 | −54.81723 | 0.002066 | 0.000217 | −0.00002 |
| 9 | 22.549235 | −0.027599 | 0.002957 | −0.000119 |
| 10 | 6.951181 | −0.01325 | 0.000595 | 0 |
| 11 | −25.81716 | −0.001702 | 0.001055 | −0.000045 |
| 12 | −8.669333 | −0.007171 | 0.001496 | −0.000066 |
| 13 | −52.60729 | −0.003063 | 0.000116 | 0.000002 |

TABLE 18

| Note | Material | Focal Length | CTE(ppm) |
|---|---|---|---|
| First Lens | Plastic | −3.436194 | 60 |
| Second Lens | Plastic | 18.937894 | 66 |
| Third Lens | Glass | 5.617229 | 8 |
| Fourth Lens | Plastic | 12.163183 | 60 |
| Fifth Lens | Plastic | −4.876618 | 66 |
| Sixth Lens | Plastic | 4.429409 | 60 |

In an image capturing lens system, focal lengths of first to sixth lengths may be determined to be within a predetermined range. For example, the focal length of the first lens may be determined in a range from −6.2 mm to −1.8 mm, the focal length of the second lens may be determined to be 10 mm or more or −20 mm or less, the focal length of the third lens may be determined in a range from 2.7 mm to 16.0 mm, the focal length of the fourth lens may be determined in a range from 3.6 mm to 14.0 mm, the focal length of the fifth lens may be determined in a range from −7.5 mm to −2.6 mm, and the focal length of the sixth lens may be determined in a range from 3.4 mm to 13.0 mm.

The image capturing lens system satisfies at least one of the above-described Conditional Expressions. Table (19) lists values of Conditional Expressions of image capturing lens systems according to the respective examples.

TABLE (19)

| | First Example | Second Example | Third Example | Fourth Example | Fifth Example | Sixth Example |
|---|---|---|---|---|---|---|
| Gf/f | 1.4396 | 1.1650 | 1.7942 | 1.8600 | 1.6754 | 1.7554 |
| BFL/S8S13 | 1.0666 | 1.2277 | 0.7230 | 0.8749 | 1.1718 | 1.2561 |
| f3/f | 4.3774 | 1.1650 | 1.7942 | 1.8600 | 1.6754 | 1.7554 |
| f4/f | 1.4396 | 4.1461 | 1.3400 | 1.5005 | 4.5200 | 3.8010 |
| TL/f | 4.3741 | 4.3753 | 4.3157 | 4.3344 | 4.3759 | 4.3747 |

A camera module 10 according to an example will be described with reference to FIG. 19.

Figure 19:
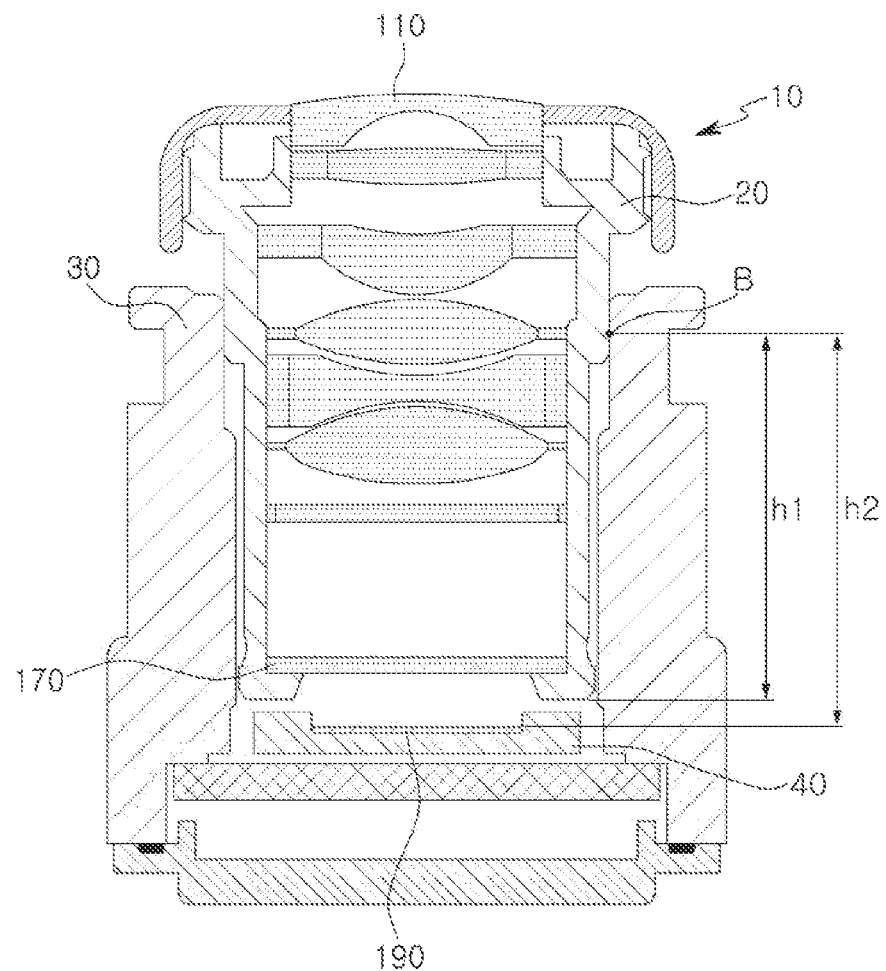
FIG. 19 is a cross-sectional view of a camera module according to an example.

The camera module 10 includes one or more image capturing lens systems according to the above-described examples (for example, an image capturing lens system, illustrated in FIG. 19, has the configuration as the image capturing lens system 100 according to the first example). The camera module 10 is configured such that optical performance of an image capturing lens system is constantly maintained irrespective of temperature variations. For example, the camera module 10 includes a lens barrel 20 and a housing 30 having different coefficients of linear thermal expansion. The coefficient of linear thermal expansion of the lens barrel 20 is $2 \times 10^{-5}$ to $8 \times 10^{-5}$, and the coefficient of linear thermal expansion of the housing 30 is $2 \times 10^{-5}$ to $8 \times 10^{-5}$. Although a range of the coefficient of linear thermal expansion of the lens barrel 20 is the same as a range of the coefficient of linear thermal expansion of the housing 30, a camera module according to an example is selected to have different coefficients of linear thermal expansion.

The camera module 10 is configured to separately accommodate a lens portion and the imaging plane (an image sensor) 190 of the image capturing lens system 100. For example, the lens portion of the image capturing lens system 100 is accommodated in the lens barrel 20, and the imaging plane 190 thereof is accommodated in the housing 30. The housing 30 may further include an additional substrate 40 to support the imaging plane 196.

A length of the lens barrel 20 may be determined in consideration of a variation in back focal length (BFL) of the image capturing lens system 100 depending on temperature variations. For example, a distance h1 from a bonding location B of the lens barrel 20 and the housing 30 to a lower end of the lens barrel 20 may be determined in consideration of the BFL of the image capturing lens system 100, the coefficient of linear thermal expansion of the lens barrel 20, and the like. Alternatively, the distance h1 from the bonding location of the lens barrel 20 and the housing 30 to the lower end of the lens barrel 20 may be determined by a difference between the coefficients of linear thermal expansion of the lens barrel 20 and the housing 30.

Similarly, the bonding location of the lens barrel 20 and the housing 30 may be determined in consideration of a variation in the BFL of the image capturing lens system 100 depending on temperature variations. For example, a distance h2 from the bonding location B to the imaging plane 190 may be determined in consideration of the BFL of the image capturing lens system 100, the coefficient of linear thermal expansion of the lens barrel 20, and the like. Alternatively, the distance h2 from the bonding location B to the imaging plane 190 may be determined by the difference between the coefficients of linear thermal expansion of the lens barrel 20 and the housing 30.

As described above, an image capturing lens system according to the examples may perform constant optical performance irrespective of temperature variations of a surrounding environment.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image capturing lens system comprising:
a first lens having a refractive power;
a second lens having a positive refractive power and a convex object-side surface;
a third lens having positive refractive power and a concave object-side surface;
a fourth lens having a convex object-side surface;
a fifth lens having a concave image-side surface; and
a sixth lens having a refractive power,
wherein the image capturing lens system comprises no more than six lenses,
wherein the first to sixth lenses are sequentially disposed in ascending numerical order from an object side toward an imaging plane,
wherein a numerical value of a radius of curvature of an object-side surface of the third lens is greater than a numerical value of a radius of curvature of an image-side surface of the fourth lens, and
wherein TL/f<5.0, where TL is a distance from an object-side surface of the first lens to the imaging plane and f is a focal length of the image capturing lens system.

2. The image capturing lens system of claim 1, wherein f3/f<2.0, where f3 is a focal length of the third lens.

3. The image capturing lens system of claim 1, wherein f4/f <2.0, where f4 is a focal length of the fourth lens.

4. The image capturing lens system of claim 1, wherein D34<D23, where D23 is a distance from an image-side surface of the second lens to the object-side surface of the third lens and D34 is a distance from an image-side surface of the third lens to the object-side surface of the fourth lens.

5. The image capturing lens system of claim 1, wherein D45<D34, where D34 is a distance from an image-side surface of the third lens to the object-side surface of the fourth lens and D45 is a distance from an image-side surface of the fourth lens to the object-side surface of the fifth lens.

6. An image capturing lens system comprising:
a first lens having a refractive power;
a second lens having a positive refractive power;
a third lens having positive refractive power;
a fourth lens having a convex object-side surface;
a fifth lens having a concave image-side surface; and
a sixth lens having a refractive power,
wherein the image capturing lens system comprises no more than six lenses,
wherein the first to sixth lenses are sequentially disposed in ascending numerical order from an object side toward an imaging plane,
wherein a radius of curvature of an object-side surface of the third lens is greater than a radius of curvature of an image-side surface of the fourth lens,
wherein TL/f<5.0, where TL is a distance from an object-side surface of the first lens to the imaging plane and f is a focal length of the image capturing lens system, and
wherein 1.2<BFL/f, where BFL is a distance from an image-side surface of the sixth lens to the imaging plane.

7. An image capturing lens system comprising:
a first lens having a refractive power;
a second lens having a positive refractive power;
a third lens having positive refractive power;
a fourth lens having a convex object-side surface;
a fifth lens having a concave image-side surface; and
a sixth lens having a refractive power,
wherein the image capturing lens system comprises no more than six lenses,
wherein the first to sixth lenses are sequentially disposed in ascending numerical order from an object side toward an imaging plane,
wherein a radius of curvature of an object-side surface of the third lens is greater than a radius of curvature of an image-side surface of the fourth lens,
wherein TL/f<5.0, where TL is a distance from an object-side surface of the first lens to the imaging plane and f is a focal length of the image capturing lens system, and
wherein 0.7<BFL/S8S13, where BFL is a distance from an image-side surface of the sixth lens to the imaging plane and S8S13 is a distance from an object-side surface of the fourth lens to the image-side surface of the sixth lens.

8. An image capturing lens system comprising:
a first lens having a refractive power;
a second lens having a positive refractive power;
a third lens having positive refractive power;
a fourth lens having a convex object-side surface;
a fifth lens having a concave image-side surface; and
a sixth lens having a refractive power,
wherein the image capturing lens system comprises no more than six lenses,
wherein the first to sixth lenses are sequentially disposed in ascending numerical order from an object side toward an imaging plane,
wherein TL/f<5.0, where TL is a distance from an object-side surface of the first lens to the imaging plane and f is a focal length of the image capturing lens system,
wherein a focal length of the second lens is 10 mm or more or −20 mm or less, and
wherein 0.7<BFL/S8S13, where BFL is a distance from an image-side surface of the sixth lens to the imaging plane and S8S13 is a distance from an object-side surface of the fourth lens to the image-side surface of the sixth lens.

9. The image capturing lens system of claim 8, wherein the first lens has a convex object-side surface.

10. The image capturing lens system of claim 8, wherein the first lens has a concave image-side surface.

11. The image capturing lens system of claim 8, wherein the second lens has a convex object-side surface.

12. The image capturing lens system of claim 8, wherein the second lens has a concave image-side surface.

13. The image capturing lens system of claim 8, wherein the third lens has a convex object-side surface.

14. The image capturing lens system of claim 8, wherein the fourth lens has a convex image-side surface.

15. The image capturing lens system of claim 8, wherein the fifth lens has a concave image-side surface.

16. The image capturing lens system of claim 8, wherein the sixth lens has a convex object-side surface.

* * * * *